G. W. MOORE & J. W. PERTZ.
Balance Steam-Valve.
No. 217,395.  Patented July 8, 1879.
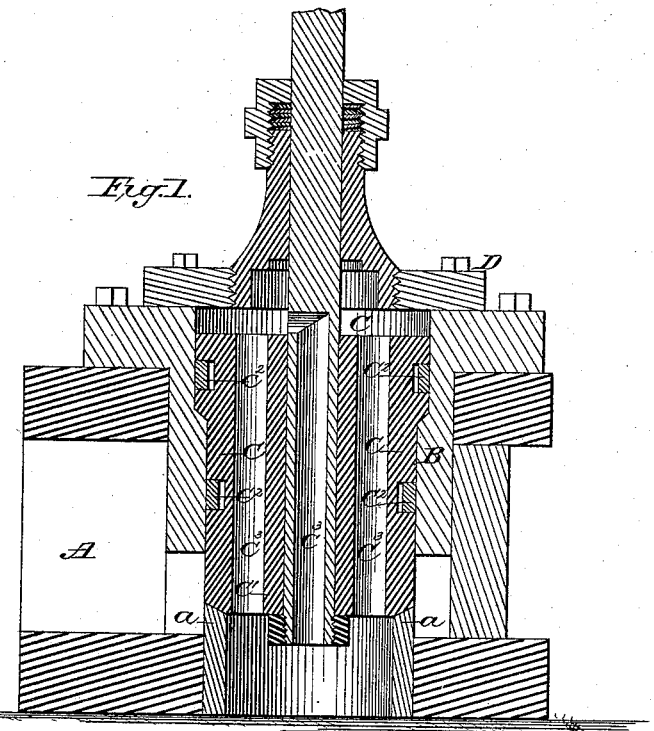
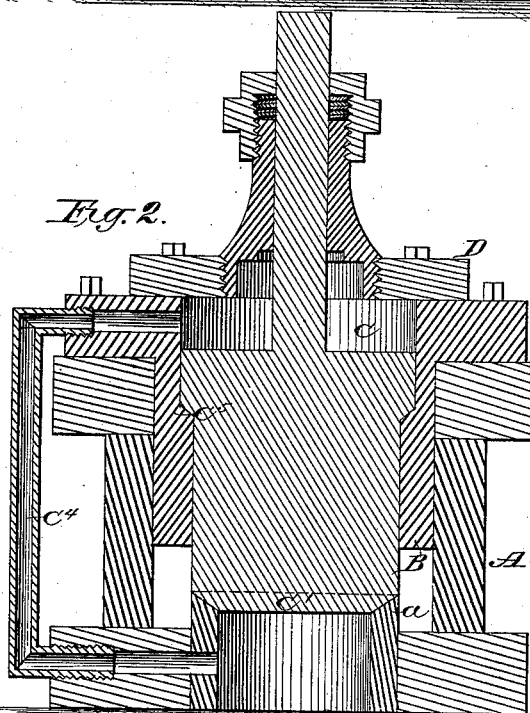
Witnesses:
Inventors:
George W. Moore
John W. Pertz
by Bakewell & Kerr Attys

UNITED STATES PATENT OFFICE.

GEORGE W. MOORE AND JOHN W. PERTZ, OF PITTSBURG, PENNSYLVANIA.

IMPROVEMENT IN BALANCE STEAM-VALVES.

Specification forming part of Letters Patent No. 217,395, dated July 8, 1879; application filed March 6, 1879.

*To all whom it may concern:*

Be it known that we, GEORGE W. MOORE and JOHN W. PERTZ, of Pittsburg, in the county of Allegheny and State of Pennsylvania, have invented a new and useful Improvement in Balance Steam-Valves; and we do hereby declare the following to be a full, clear, and exact description thereof, reference being had to the acompanying drawings, forming part of this specification, in which—

Figure 1 is a central section of a valve embodying our invention. Fig. 2 is a sectional view of a modification.

Like letters refer to like parts wherever they occur.

Our invention relates to the construction of balance-valves, such as puppet-valves, for lever and other engines, throttle-valves, &c.; and consists, mainly, in giving to the valve a piston or similar shape, providing the same with two valve-seats, and forming ports either through or around the valve, whereby the pressure on the surfaces of the valve is equalized, and a simple, durable, and effective balance-valve is obtained.

Heretofore in the class of valves to which this invention relates the valve has commonly consisted either of a single disk, in which case it was not a balance-valve, and required great power to operate it, or it has been composed of two disks (or valves) of unequal area, so as to utilize the difference in pressure on the two disks, in which latter case it only approximated a true balance-valve. The second construction, though materially reducing the power requisite to operate the valve, is, in the main, objectionable, as the force of the steam, acting against the disks in opposite directions, puts such strain on the spindle or stem that the valve will frequently be sprung from the seat and leak. Furthermore, the difference in expansion between the valve-spindle, which is surrounded by steam, and the steam-chest, which is exposed to the atmosphere, will frequently cause such valves to leak.

The object of the present invention is to so construct the valve that it shall have all of the advantages and none of the disadvantages of the puppet-valve.

We will now proceed to describe our invention, so that others skilled in the art to which it appertains may apply the same.

A indicates the steam-chest, and $a$ the usual valve-seat. Above the valve-seat is a cylinder, B, adapted to receive the body of the valve, which is in substance a piston. C indicates the valve, which, in the preferred form, (shown in Fig. 1,) is a piston of greater area above, as at $c$, than below, $c^1$, and it may be provided with suitable packing-rings $c^2$, which cause it to work substantially steam-tight in cylinder B. $c^3$ indicates one or more ports extending through the valve in such manner as to connect the upper and under surfaces of the valve; but instead thereof the same result may be obtained where a solid valve is employed by connecting the upper part of the cylinder B with a point below the valve-seat $a$ by means of a port (shown at $c^4$, Fig. 2) made either in the body of the cylinder or by an independent pipe, as preferred.

The object to be attained by increasing the area of the valve, as at $c$, is to facilitate and insure the dropping or seating of the valve with the application of little if any power, and for this purpose the difference between the diameters of the valve may be varied, as circumstances and judgment indicate.

In Fig. 1 a packing-ring or set of packing-rings, $c^2$, are shown as employed for packing the valve C, with its cylinder B; but the ring or rings may be omitted. We form a seat, $c^5$, in the upper part of cylinder B and bevel the shoulder of the valve to correspond, as shown in Fig. 2, and such construction will be found very effective. D indicates the cap closing the cylinder B, and through which the stem of the valve passes.

The operation of the valve will be as follows: The instant the valve C commences to rise from seat $a$ the steam will pass by ports $c^3$ (or in the modification the passage $c^4$) to the upper face of the valve, and immediately equalize the steam-pressure, causing the valve to balance. If the area at $c$ be made proportionately larger than the area of the face of the valve, then little if any power will be required to close the valve. When the valve closes the steam will be exhausted from surface $c$ or the upper part of cylinder B through port $c^3$, (or $c^4$, as the case may be,) and as the steam-pressure will then be exerted only around the lower part of valve C little power will be required to lift the valve from its seat.

The advantages of our invention are, first, the perfection of balance obtained, which so decreases the power necessary to operate the valves that much lighter levers, &c., may be used; secondly, the durability of the valve and its non-liability to get out of order; thirdly, the facility with which it can be constructed, so as to insure proper seating of the valve; fourthly, the compactness of the valve as compared with the ordinary balance puppet-valves.

Having thus described the nature and advantages of our invention, what we claim, and desire to secure by Letters Patent, is—

A puppet-valve consisting of the piston-valve and the valve-cylinder, having the two valve-seats for the valve and a port or ports either through or around the piston, the whole constructed and arranged substantially as and for the purpose specified.

In testimony whereof we, the said GEORGE W. MOORE and JOHN W. PERTZ, have hereunto set our hands.

GEORGE W. MOORE.
JOHN WM. PERTZ.

Witnesses:
T. W. RITTER, Jr.,
R. H. WHITTLESEY.